(12) United States Patent
Wang et al.

(10) Patent No.: US 9,629,138 B2
(45) Date of Patent: Apr. 18, 2017

(54) METHOD, DEVICE AND SYSTEM FOR TRANSMITTING DOWNLINK CONTROL CHANNEL

(71) Applicant: Huawei Technologies Co., Ltd., Shenzhen, Guangdong (CN)

(72) Inventors: Fan Wang, Shenzhen (CN); Zhenfei Tang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 53 days.

(21) Appl. No.: 14/188,286

(22) Filed: Feb. 24, 2014

(65) Prior Publication Data
US 2014/0169312 A1 Jun. 19, 2014

Related U.S. Application Data

(63) Continuation of application No. PCT/CN2012/080609, filed on Aug. 27, 2012.

(30) Foreign Application Priority Data

Aug. 25, 2011 (CN) .......................... 2011 1 0246521

(51) Int. Cl.
*H04W 72/04* (2009.01)
*H04W 48/12* (2009.01)
*H04W 72/12* (2009.01)

(52) U.S. Cl.
CPC ......... *H04W 72/042* (2013.01); *H04W 48/12* (2013.01); *H04W 72/1273* (2013.01)

(58) Field of Classification Search
None
See application file for complete search history.

(56) References Cited

U.S. PATENT DOCUMENTS

| | | | |
|---|---|---|---|
| 2010/0279628 A1* | 11/2010 | Love et al. ..................... 455/70 |
| 2011/0103272 A1 | 5/2011 | Dai et al. | |
| 2014/0036828 A1* | 2/2014 | Papasakellariou .... H04L 5/0053 370/329 |

FOREIGN PATENT DOCUMENTS

| | | |
|---|---|---|
| CN | 102186251 A | 9/2011 |
| WO | WO 2011052978 A2 | 5/2011 |
| WO | WO 2011090688 A2 | 7/2011 |

OTHER PUBLICATIONS

"3$^{rd}$ Generation Partnership Project—Technical Specifications Group Radio Access Network; Evolved Universal Terrestrial Radio Access (E-UTRA); Physical layer procedures (Release 10)," 3GPP-TS 36.213, Version 10.2.0, 3$^{rd}$ Generation Partnership Project, Valbonne, France (Jun. 2011).

(Continued)

*Primary Examiner* — Rhonda Murphy
(74) *Attorney, Agent, or Firm* — Leydig, Voit & Mayer, Ltd.

(57) ABSTRACT

The present invention discloses a downlink control channel transmission method, characterized by comprising: user equipment (UE) receives a first downlink control information (DCI) and a second DCI, wherein, the first DCI and the second DCI are used for jointly indicating scheduling information carried by a downlink control channel; the UE determines the first DCI as a primary DCI and the second DCI as a secondary DCI; and the UE acquires the scheduling information carried by the downlink control channel according to the primary DCI and the secondary DCI. Also disclosed in the present invention are a communication device and a system. According to the solution provided by the present invention, the transmission of the downlink control channel corresponding to an extended resource is indicated, and the backward compatibility of the control channel is ensured.

13 Claims, 5 Drawing Sheets

(56) References Cited

OTHER PUBLICATIONS

"Primary and Secondary PDCCH Design for LTE-A," 3GPP TSG-RAN WG1 Meeting #57, San Francisco, USA, R1-092227, $3^{rd}$ Generation Partnership Project, Valbonne, France (May 4-8, 2009).
"Common PDCCH Design for Carrier Aggregation," 3GPP TSG RAN1#56bis, Seoul, Korea, R1-091327, $3^{rd}$ Generation Partnership Project, Valbonne, France (Mar. 23-27, 2009).
"$3^{rd}$ Generation Partnership Project; Technical Specification Group Radio Access Network; Evolved Universal Terrestrial Radio Access (E-UTRA); Multiplexing and channel coding (Release 8)," DRAFT3GPP TS 36.212, V8.5.0, pp. 1-58, $3^{rd}$ Generation Partnership Project, Valbonne, France (Dec. 2008).
"Control channel structure extension for post Release 8 LTE," 3GPP TSG RAN1 #57a, San Francisco, USA, R1-091944, $3^{rd}$ Generation Partnership Project, Valbonne, France (May 4-8, 2009).
"Multicarrier Control for LTE-Advanced," 3GPP TSG RAN WG1 #56, Athens, Greece, R1-090862, $3^{rd}$ Generation Partnership Project, Valbonne, France (Feb. 9-13, 2009).
"Primary and Secondary PDCCH Design for LTE-A," 3GPP TSG-RAN WG1 meeting #57, San Francisco, California, R1-091707, $3^{rd}$ Generation Partnership Project, Valbonne, France (May 4-8, 2009).

* cited by examiner

METHOD, DEVICE AND SYSTEM FOR TRANSMITTING DOWNLINK CONTROL CHANNEL

CROSS-REFERENCE TO RELATED APPLICATIONS

The application is a continuation of International Patent Application No. PCT/CN2012/080609, filed on Aug. 27, 2012, which claims priority to Chinese patent application No. 201110246521.1, filed on Aug. 25, 2011, both of which are hereby incorporated by reference in their entireties.

FIELD OF TECHNOLOGY

The present invention relates to wireless communication technologies, in particular to a method, a device and a system for transmitting a downlink control channel.

BACKGROUND OF THE INVENTION

In wireless communications, a bandwidth of a communication system may be determined according to a communication standard. However, frequency spectrum owned by an operator may not just be the one defined in the communication standard, and thus, in order to improve the utilization efficiency of nonstandard frequency spectrum, the bandwidth may be extended.

Information for scheduling a channel carrying downlink data is included in downlink control information (DCI), and the DCI includes resource indication information for supporting a frequency location of the channel carrying the downlink data. For a bandwidth defined in a communication standard, the size of a DCI corresponding to the bandwidth is fixed. With the extension of the bandwidth, the bigger the bandwidth of a system is, the higher the overhead of resource indication information is, and the size of the DCI is inconsistent with that of the DCI corresponding to the bandwidth defined in the communication standard.

SUMMARY OF THE INVENTION

Provided in the present invention are a method, a device and a system for transmitting a downlink control channel, which may ensure backward compatibility of a control channel.

In one aspect, provided in the present invention is a method for transmitting a downlink control channel, including: receiving, by a user equipment (UE), a first downlink control information DCI and a second DCI, wherein, the first DCI and the second DCI are used for jointly indicating scheduling information carried by a downlink control channel;

determining, by the UE, the first DCI as a primary DCI and the second DCI as a secondary DCI;

acquiring, by the UE, the scheduling information carried by the downlink control channel according to the primary DCI and the secondary DCI.

In another aspect, provided in the present invention is a method for transmitting a downlink control channel, including: carrying, by a base station, information for jointly indicating scheduling information carried by a downlink control channel on a first DCI and a second DCI, wherein, the first DCI is a primary DCI, and the second DCI is a secondary DCI;

sending, by the base station, the first DCI and the second DCI to a UE.

In yet another aspect, provided in the present invention is a UE, including: a receiver, configured to receive a first DCI and a second DCI, wherein, the first DCI and the second DCI are used for jointly indicating scheduling information carried by a downlink control channel;

a first processor, configured to determine the first DCI as a primary DCI and the second DCI as a secondary DCI;

a second processor, configured to acquire the scheduling information carried by the downlink control channel according to the primary DCI and the secondary DCI.

In still yet another aspect, provided in the present invention is a base station, including: a third processor, configured to carry information for jointly indicating scheduling information carried by a downlink control channel on a first DCI and a second DCI, wherein, the first DCI is a primary DCI, and the second DCI is a secondary DCI;

a transmitter, used for sending the first DCI and the second DCI to a UE.

According to the aforementioned technical solution provided in the present invention, a base station sends two DCIs which are a primary DCI and a secondary DCI respectively to a UE, and the UE may acquire scheduling information carried by a downlink control channel according to information included in the primary DCI and the secondary DCI after the UE receives the two DCIs, so that the transmission of the downlink control channel corresponding to an extended resource is indicated, and the backward compatibility of the control channel is ensured.

DETAILED DESCRIPTION OF THE EMBODIMENTS

Figure 1:
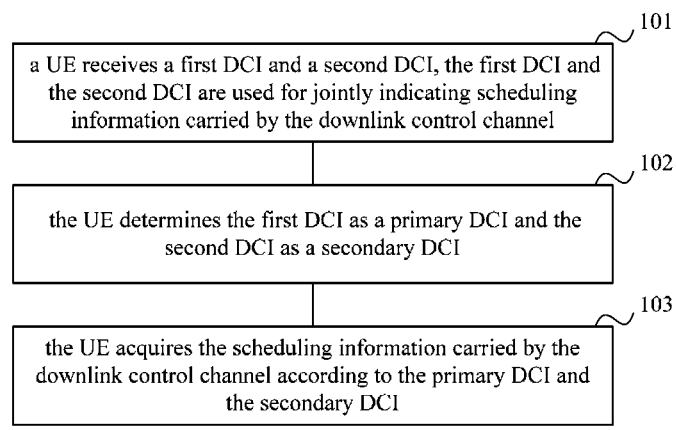
FIG. 1 is a flow schematic view of a method for transmitting a downlink control channel provided in an embodiment of the present invention.

In order that the specific technical solution and objectives of the present invention are clearer, the present invention is further illustrated below in conjunction with specific embodiments and drawings.

The technical solution provided in an embodiments of the present invention may be applied to various wireless communication networks, such as Code Division Multiple Access (Code Division Multiple Access, CDMA), Time division multiple access (Time division multiple access, TDMA), Frequency Division Multiple Access (Frequency Division Multiple Access, FDMA), Orthogonal frequency-division multiple access (Orthogonal frequency-division multiple access, OFDMA), single carrier FDMA (single carrier FDMA, SC-FDMA), other networks and the like. Terms "network" and "system" may be mutually replaced. The CDMA network may realize wireless technologies such as universal terrestrial radio access (universal terrestrial radio access, UTRA), CDMA2000 and the like. UTRA may include CDMA (WCDMA) and other varieties of CDMA. CDMA2000 may cover Interim Standard (Interim Standard, IS) 2000 (IS-2000), IS-95 and IS-856 standards. The TDMA network may realize wireless technologies such as global system for mobile communication (global system for mobile communication, GSM) and the like. The OFDMA network may realize wireless technologies such as evolved UTRA (evolved UTRA, E-UTRA), ultra mobile broadband (ultra mobile broadband, UMB), IEEE 802.11 (Wi-Fi), IEEE 802.16 (WiMAX), IEEE 802.20, Flash OFDMA and the like. UTRA and E-UTRA are UMTS and UMTS evolved versions. 3GPP is a new version using the UMTS of E-UTRA in long term evolution (long term evolution, LTE) and LTE Advanced (LTE Advanced, LTE-A). UTRA, E-UTRA, UMTS, LTE, LTE-A and GSM are recorded and described in documents of the 3GPP standard organization. CDMA2000 and UMB are recorded and described in documents of the 3GPP2 standard organization. The technologies described in the embodiments of the present invention may also be applied to the aforementioned wireless networks and wireless technologies.

In embodiments of the present invention, a base station (base station, BS) may be a station communicating with a user equipment (user equipment, UE) or other communication stations such as a relay station, and the base station may provide communication coverage of a specific physical area. The base station may provide the communication coverage for a macro cell, a pico cell, a femto cell and/or other types of cells. The macro cell may cover a relatively large geographic area (e.g., a range with a radius of a few kilometers) and permit unlimited access of a UE which has performed service subscription. The pico cell may cover a relatively small geographic area and permit unlimited access of a UE which has performed service subscription. The femto cell covers a relatively small geographic area (e.g., a home), and permits limited access of a UE (e.g., a UE in a CSG cell) associated with the femto cell. A base station serving a macro cell may be named as a macro base station, a base station serving a pico cell may be named as a pico base station, and a base station serving a femto cell may be named as a femto base station or a home base station. A base station may support one or more cells.

In embodiments of the present invention, a UE may be distributed in the whole wireless network, and each UE may be static or mobile. The UE may be named as a terminal, a mobile station, a subscriber unit, a station and the like. The UE may be a cellular phone, a personal digital assistant (personal digital assistant, PDA), a wireless modem, wireless communication equipment, a handheld device, a laptop computer, a cordless phone, a wireless local loop (wireless local loop, WLL) station and the like. The UE may communicate with a macro base station, a pico base station, a femto base station and the like.

As shown in FIG. 1, provided in the embodiment of the present invention is a method for transmitting a downlink control channel, including:

Step 101: a UE receives a first DCI and a second DCI, wherein, the first DCI and the second DCI are used for jointly indicating scheduling information carried by the downlink control channel.

Step 102: the UE determines the first DCI as a primary DCI and the second DCI as a secondary DCI.

Step 103: the UE acquires the scheduling information carried by the downlink control channel according to the primary DCI and the secondary DCI.

In the embodiment of the present invention, the UE acquires the scheduling information carried by the downlink control channel according to the primary DCI and the secondary DCI, namely, the UE may directly acquire parts of the scheduling information carried by the downlink control channel from the primary DCI and the secondary DCI respectively and then acquire the scheduling information carried by the downlink control channel, or the UE may also determine a new DCI according to the primary DCI and the secondary DCI and then acquire the scheduling information carried by the downlink control channel according to the new DCI.

Figure 2:
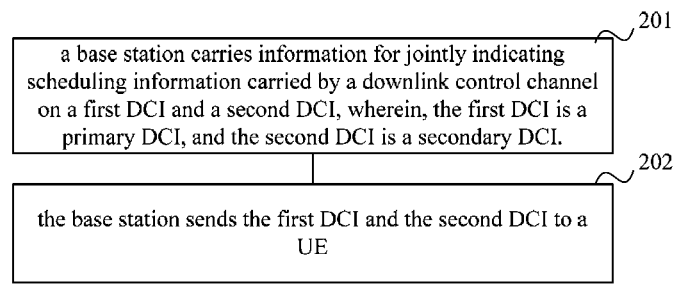
FIG. 2 is a flow schematic view of another method for transmitting a downlink control channel provided in an embodiment of the present invention.

As shown in FIG. 2, provided in an embodiment of the present invention is another method for transmitting a downlink control channel, including:

Step 201: a base station carries information for jointly indicating scheduling information carried by a downlink control channel on a first DCI and a second DCI, wherein, the first DCI is a primary DCI, and the second DCI is a secondary DCI.

Step 202: the base station sends the first DCI and the second DCI to a UE.

According to the technical solution provided in the embodiment of the present invention, if a resource actually used by a system is bigger than a standard resource stipulated in a communication standard, namely, an extended resource is used, for example, a bandwidth actually used by the system is bigger than a standard bandwidth, or, a time domain resource actually used by the system is bigger than a standard time domain resource, or a code domain resource actually used by the system is bigger than a standard code domain resource, wherein, the standard resource is a resource stipulated in the communication standard and used in the system and includes a time domain resource, a frequency domain resource or a code domain resource, and the nonstandard resource is a resource different from the resource stipulated in the communication standard. The base station may send the first DCI and the second DCI, which are the primary DCI and the secondary DCI respectively, to the UE, and the UE may acquire scheduling information carried by the downlink control channel according to the information carried by the primary DCI and the secondary DCI and used for jointly indicating the scheduling information carried by the downlink control channel after receiving the two DCIs, so that the transmission of the downlink control channel corresponding to the extended resource is indicated, and backward compatibility of the control channel is ensured.

In the embodiment of the present invention, the downlink control channel is a channel for transmitting a control channel and may be different channels in different systems, for example, in a LTE system or a LTE-A system, the downlink control channel may be a physical downlink control channel (physical downlink control channel, PDCCH).

In the embodiment of the present invention, for different systems, the scheduling information carried by the downlink control channel may be different, for example, in a system in which a frequency domain is extended, the scheduling information carried by the downlink control channel may be information for indicating resource assignment of the frequency domain, or, in a system in which a time domain is extended, the scheduling information carried by the downlink control channel may be information for indicating resource assignment of the time domain, or, in a system in which a code domain is extended, the scheduling information carried by the downlink control channel is information for indicating resource assignment of the code domain.

Figure 3:
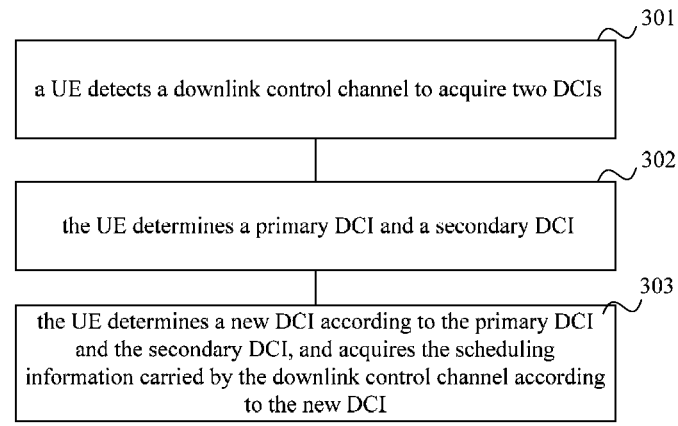
FIG. 3 is a flow schematic view of a method for transmitting a downlink control channel provided in an embodiment of the present invention.

As shown in FIG. 3, provided in the embodiment of the present invention is a method for transmitting a downlink control channel. The method may be applied to a communication system, and the communication system at least includes a UE and a base station. In the method provided in the embodiment of the present invention, the resource is illustrated by taking a bandwidth as an example. For those skilled in the art, a method for indicating an extended time domain resource or code domain resource may be realized with reference to the method provided in the embodiment, which will not be described in the embodiment of the present invention one by one. The method may include:

step 301: the UE detects a downlink control channel to acquire two DCIs.

In the embodiment of the present invention, the UE may support a standard bandwidth or a nonstandard bandwidth. The standard bandwidth is the one stipulated in the communication standard, for example, in the LTE system, the standard bandwidth may include 1.4 MHz, 3 MHz, 5 MHz, 10 MHz, 15 MHz, 20 MHz and the like. The frequency spectrum actually owned by the operator may have a bandwidth of 4.6 MHz, 9.6 MH or the like which is inconsistent with the standard bandwidth stipulated in the communication standard, namely, a nonstandard bandwidth.

In the embodiment of the present invention, the UE may learn that the bandwidth required to be supported by the UE is the nonstandard bandwidth through high-layer signaling sent by the base station.

The two DCIs are sent by the base station by being carried on the downlink control channel, and the downlink control signaling format of the two DCIs is that of the DCI corresponding to the standard bandwidth. Namely, even if the extended bandwidth actually used in the system is nonstandard bandwidth, the downlink control signaling format of the DCI carried by the downlink control channel still adopts the downlink control signaling format of the DCI corresponding to the standard bandwidth. For example, in the 3GPP LTE release 8 (release 8, R8) system, the standard bandwidth is 10 MHz, the actually used bandwidth is 12 MHz, and the downlink control signaling format of the DCI carried by the PDCCH by the base station still complies with the downlink control signaling format of the DCI in the 3GPP R8 specification.

The two DCIs received by the UE may be marked as the first DCI and the second DCI respectively, and the two DCIs may have the same downlink control signaling format or different downlink control signaling formats. The base station may distinguish between the two DCIs, i.e., distinguish between a primary DCI and a secondary DCI, for example, the first DCI is used as the primary DCI, the second DCI is used as the secondary DCI, and the base station and the UE may comply with the rule that the base station distinguishes the primary DCI and the secondary DCI. The primary DCI includes resource indication information, and the resource indication information may be included in a resource indication field, for example, included in a resource block assignment (resource block assignment) field. The secondary DCI includes extension information, and the extension information is used for extending the resource indication information in the primary DCI. For example, the nonstandard bandwidth actually used by the system is bigger than the standard bandwidth stipulated in the communication standard; if the standard bandwidth stipulated in the communication standard is used, the scheduling information carried by the downlink control channel may be indicated through one primary DCI; and because the nonstandard bandwidth actually used by the system is bigger than the standard bandwidth, the resource indication information included in the primary DCI may be extended through one secondary DCI to indicate the scheduling information carried by the downlink control channel. For example, in the primary DCI, the number of bits occupied by the resource indication information for indicating the scheduling information carried by the downlink control channel corresponding to the standard bandwidth is x, while the resource indication information for indicating the scheduling information carried by the downlink control channel requires y bits according to the nonstandard bandwidth actually used by the system, wherein, x and y are integers bigger than or equal to 1, and y is bigger than x. Then, in the secondary DCI, (y−x) bits are selected as the extension information for extending the resource indication information in the primary DCI.

In the embodiment of the present invention, the UE may support scheduling of 1 downlink grant (downlink grant, DL grant) or 2 DL grants. When the UE detects 1 DL grant, the UE may perform scheduling in the standard bandwidth; and when the UE detects 2 DL grants, the UE may perform scheduling in the nonstandard bandwidth.

Step 302: the UE determines the primary DCI and the secondary DCI.

For the acquired 2 DCIs, the UE may determine the primary DCI and the secondary DCI. The secondary DCI includes extension information, and the extension information is used for extending the resource indication information in the primary DCI.

In the embodiment of the present invention, the 2 DCIs acquired by the UE may have the same downlink control signaling format or may have different downlink control signaling formats.

When the 2 DCIs have the same downlink control signaling format or do not have the same downlink control signaling format, the UE may determine the primary DCI and the secondary DCI through any of the following rules, and the following rules may be complied with by the UE and the base station:

the logical number of the first control channel element (control channel element, CCE) occupied by the primary DCI is bigger than that of the first CCE occupied by the secondary DCI, the logical number of CCEs may be 0 to $N_{CCE,k}-1$, wherein, $N_{CCE,k}-1$ is the total number of the CCEs in a control region (control region) in a sub-frame k, and the k may be an integer bigger than or equal to 0. Under such a rule, in the 2 DCIs, the DCI occupying the first CCE with the bigger logical number is determined as the primary DCI, and the DCI occupying the first CCE with the smaller logical number is determined as the secondary DCI; or, the logical number of the first CCE occupied by the primary DCI is smaller than that of the first CCE occupied by the secondary DCI. Under such a rule, in the 2 DCIs, the DCI occupying the first CCE with the smaller logical number is determined as the primary DCI, and the DCI occupying the first CCE with the bigger logical number is determined as the secondary DCI; or, the cyclical redundancy check (cyclical redundancy check, CRC) of the primary DCI is scrambled by adopting a special code point, the CRC of the secondary DCI is not scrambled by adopting the special code point, and the special code point may be a code point predefined by the UE and the base station or a code point configured and designated by the system. For example, the CRC of the DCI may be scrambled by adopting the special code point <0, 0, 0, 0, 0, 0, 0, 0, 0, 0, 0, 0, 0, 0, 0, 0, 0> or <0, 0, 0, 0, 0, 0, 0, 0, 0, 0, 0, 0, 0, 0, 0, 1>. Under such a rule, the UE may determine the received DCI as the primary DCI or the secondary DCI by detecting whether the CRC of the received DCI adopts the special code point, if the CRC of the DCI is scrambled by adopting the special code point, the DCI is determined as the primary DCI, and the DCI of which the CRC is not scrambled by adopting the special code point is the secondary DCI; or, the CRC of the primary DCI is not scrambled by adopting the special code point, and the CRC of the secondary DCI is scrambled by adopting the special code point. Under such a rule, the UE may determine the received DCI as the primary DCI or the secondary DCI by detecting whether the CRC of the received DCI adopts the special code point, if the CRC of the DCI is scrambled by adopting the special code point, the DCI is determined as the secondary DCI, and the DCI of which the CRC is not scrambled by adopting the special code point is the primary DCI; or, the CRCs of the primary DCI and the secondary DCI are scrambled by adopting different special code points. Under such a rule, the UE may determine the received DCI as the primary DCI or the secondary DCI by detecting the difference of the special code points for the CRC of the received DCI, for example, the CRC of the first DCI is scrambled by adopting a first special code point, and the CRC of the second DCI is scrambled by adopting a second special code point different from the first special code point; if the UE and the base station preset that the DCI of which the CRC is scrambled by adopting the first special code point is the primary DCI and the DCI of which the CRC is scrambled by adopting the second special code point is the secondary DCI, after the UE receives the first DCI and the second DCI, the UE may determine the first DCI as the primary DCI and the second DCI as the secondary DCI by detecting the code points for scrambling the first DCI and the second DCI; or, not all bits of the resource assignment field of the primary DCI are 1, and all bits of the resource assignment field of the secondary DCI are 1. Under such a rule, if all the bits in the resource assignment field of one DCI are 1, the UE determines the DCI as the secondary DCI, otherwise, the DCI is the primary DCI; or, not all bits of the modulation and code scheme (modulation and code scheme, MCS) field of the primary DCI are 1, and all bits of the MCS field of the secondary DCI are 1. Under such a rule, if all the bits in the MCS field of one DCI are 1, the UE may determine the DCI as the secondary DCI, otherwise, the DCI is the primary DCI; or, The MCS field indication information of the secondary DCI, $I_{MCS}=0$ and the redundancy version (RV) indication information is not equal to 0. Under such a rule, if the MCS field indication information of one DCI is equal to 0 and the RV indication information is not equal to 0, the UE may determine the DCI as the secondary DCI, otherwise, the UE may determine the DCI as the primary DCI.

In the LTE or LTE-A system, if the downlink control signaling format of the primary DCI is the same as that of the secondary DCI, the format may be any of format 1, format 1A, format 1B, format 1D, format 2 and format 2A.

When the 2 DCIs have different downlink control signaling formats, the UE and the base station may know a rule, and the rule stipulates that one DCI is the primary DCI and the other DCI is the secondary DCI. For example, in the LTE system or the LTE-A system, if the downlink control signaling format of one DCI is format 1A (format 1A), the downlink control signaling format of the other DCI is format x and the format x may be format 1, format 1B, format 1D, format 2 or format 2A, the DCI of which the downlink control signaling format is format 1A may be determined as the secondary DCI, and the DCI of which the downlink control signaling format is format x may be determined as the primary DCI.

Step 303: the UE determines a new DCI according to the primary DCI and the secondary DCI, and acquires the scheduling information carried by the downlink control channel according to the new DCI.

In the embodiment of the present invention, the UE may extend the resource indication information in the primary DCI according to the extension information in the secondary DCI to acquire the new DCI, the extended resource indication information in the new DCI includes the resource indication information in the primary DCI and the extension information included in the secondary DCI, and the scheduling information carried by the downlink control channel is acquired according to the extended resource indication information of the primary DCI.

Figure 4:
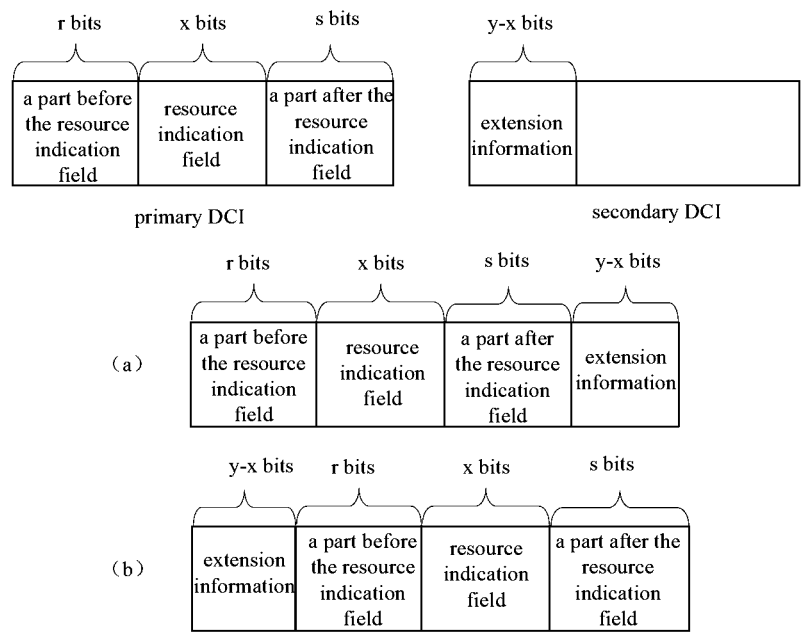
FIG. 4 is a structural schematic view of a DCI in an embodiment of the present invention.

For example, as shown in FIG. 4, the primary DCI may include three parts: a resource indication information part, occupying x bits; a part before the resource indication information, occupying r bits; and a part after the resource indication information, occupying s bits, wherein, r and s are integers bigger than or equal to 1. The secondary DCI includes (y−x) bits of extension information, and the UE may acquire the scheduling information carried by the downlink control channel according to the extended resource indication information, namely, information carried by x bits of the resource indication information part in the primary DCI and (y−x) bits in the secondary DCI.

In the embodiment of the present invention, for the extended system bandwidth used by the system, the bit number of the extension information in the secondary DCI, such as the aforementioned (y−x), is required to meet the indication requirement of the system bandwidth informed by the base station, the bit number of the extension information in the secondary DCI may be determined according to the resource indication mode of the primary DCI and the system bandwidth, and the system bandwidth is the bandwidth actually used in the system, namely, the bandwidth required to be supported by the UE. Under different system bandwidths, the numbers of the bits required for indicating resource assignment are different for different resource assignment modes. For example, the LTE system or the LTE-A system has three resource assignment modes: resource assignment type 0, resource assignment type 1 and resource assignment type 2. In the resource assignment type 0 or 1, the number of the bits required for indicating resource assignment is $\lceil N_{RB}^{DL}/P \rceil$, wherein $N_{RB}^{DL}$ is a downlink bandwidth, P is the size of a resource block group (resource block group, RBG) and is determined by the downlink bandwidth, and the relation between P and $N_{RB}^{DL}$ is as shown in table 1.

TABLE 1

| System Bandwidth $N_{RB}^{DL}$ | RBG Size (P) |
|---|---|
| ≤10 | 1 |
| 11-26 | 2 |
| 27-63 | 3 |
| 64-110 | 4 |

In the resource assignment type 2, the number of the bits required for indicating resource assignment is $\lceil \log_2(N_{RB}^{DL}(N_{RB}^{DL}+1)/2) \rceil$.

The locations of the bits for the extension information in the secondary DCI may be preset, for example, the bits for the extension information may be the first y-x bits in the secondary DCI, the last y-x bits in the secondary DCI or the like, which will be not illustrated one by one in this embodiment. It shall be noted that, the bits with specific purposes in the secondary DCI may not be selected for carrying the extension information. For example, in the LTE or LTE-A system, when the DCI of which the downlink control signaling format is format 1A is used as the secondary DCI, the bits for the extension information in the secondary DCI do not include the bits for indicating and distinguishing that the DCI is in format 1A or format 0 in the DCI.

When the UE extends the resource indication information in the primary DCI according to the extension information in the secondary DCI, the sequence of the bits of the extension information in the secondary DCI and the bits of the resource indication information in the primary DCI may be known by the UE and the base station in advance and UE and the base station may make a communication in advance, or acquire them according to predetermined rules respectively. For example, the location of the x bits in the primary DCI are before the location of the (y–x) bits in the secondary DCI, as shown in (a) of FIG. 4, or, the location of the x bits in the primary DCI are after the location of the (y–x) bits in the secondary DCI, as shown in (b) of FIG. 4, and the specific sequence may be known by the UE and the base station in advance.

In this embodiment, after the UE determines the primary DCI and the secondary DCI, the UE may directly acquire the scheduling information carried by the downlink control channel according to the resource indication information in the primary DCI and the extension information in the secondary DCI without determining the new DCI.

In the embodiment of the present invention, for example, in the LTE system or the LTE-A system, the scheduling information carried by the downlink control channel may include scheduling information for scheduling a physical downlink shared channel (physical downlink shared channel, PDSCH), and the PDSCH scheduling information includes resource assignment information of the PDSCH. The UE may acquire the resource assignment information and control information for data demodulation according to the scheduling information carried by the downlink control channel so as to receive the PDSCH.

Figure 5:
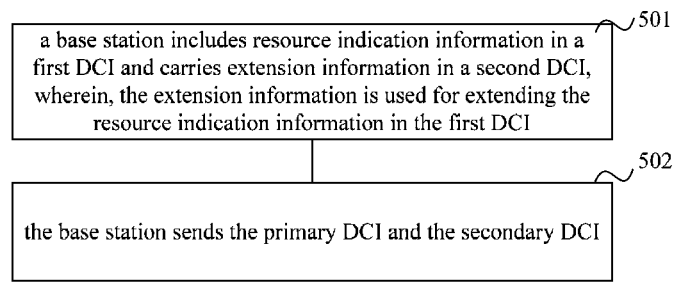
FIG. 5 is a flow schematic view of yet another method for transmitting a downlink control channel provided in an embodiment of the present invention.

As shown in FIG. 5, provided in the embodiment of the present invention is yet another method for transmitting a downlink control channel. The method may be applied to a communication system, and the communication system at least includes a base station and UE. In the method provided in the embodiment of the present invention, the bandwidth serving as a resource is taken as an example for illustration. For those skilled in the art, a method for indicating an extended time domain resource or code domain resource may be realized with reference to the method provided in the embodiment, which will not be described in the embodiment of the present invention one by one. The method may include:

step 501: the base station incorporates resource indication information into a first DCI and carries extension information into a second DCI, wherein, the extension information is used for extending the resource indication information in the first DCI.

In this embodiment, the first DCI is a primary DCI, and the second DCI is a secondary DCI.

The first DCI and the second DCI may have the same downlink control signaling format or different downlink control signaling formats.

The 2 DCIs are sent by the base station by being carried on the downlink control channel, and the downlink control signaling format of the 2 DCIs is a downlink control signaling format of a DCI corresponding to a standard bandwidth. Namely, even if a bandwidth actually used in the system is a nonstandard bandwidth, the downlink control signaling format of the DCI carried by the downlink control channel still adopts the downlink control signaling format of the DCI corresponding to the standard bandwidth. For example, in the 3GPP LTE release 8 (release 8, R8) system, the standard bandwidth is 10 MHz, the actually used bandwidth is 12 MHz, and the downlink control signaling format of the DCI carried by the PDCCH by the base station still complies with the downlink control signaling format of the DCI in the 3GPP R8 specification.

The bandwidth actually used by the system is bigger than the bandwidth stipulated in the communication standard; if the bandwidth stipulated in the communication standard is used, the scheduling information carried by the downlink control channel may be indicated through one primary DCI; and because the bandwidth actually used by the system is bigger than the standard bandwidth, the resource indication information included in the primary DCI is extended through one secondary DCI to indicate the scheduling information carried by the downlink control channel. When the system actually uses the nonstandard bandwidth, the base station may inform the UE that the bandwidth required to be supported by the UE is the nonstandard bandwidth through high-layer signaling.

The base station may distinguish the first DCI and the second DCI as the primary DCI and the secondary DCI according to the rule complied with by both the base station and the UE. When the 2 DCIs have the same downlink control signaling format or have different downlink control signaling formats, the rule may be any of the following rules:

the logical number of the first CCE occupied by the primary DCI is bigger than that of the first CCE occupied by the secondary DCI; or, the logical number of the first CCE occupied by the primary DCI is smaller than that of the first CCE occupied by the secondary DCI; or the CRC of the primary DCI is scrambled by adopting a special code point, and the CRC of the secondary DCI is not scrambled by adopting a special code point; or, the CRC of the primary DCI is not scrambled by adopting a special code point, and the CRC of the secondary DCI is scrambled by adopting a special code point; or, the CRC of the primary DCI is scrambled by adopting a first special code point, and the CRC of the secondary DCI is scrambled by adopting a second special code point different from the first special code point; or, all bits of the resource assignment field of the secondary DCI are 1; or, all bits of the MCS field of the secondary DCI are 1; or, the MCS field indication information of the secondary DCI. $I_{MCS}=0$ and the redundancy version (RV) indication information is not equal to 0.

When the first DCI and the second DCI have different downlink control signaling formats, the UE and the base station may preset one of the DCIs as the primary DCI and the other DCI as the secondary DCI.

In this embodiment, for the aforementioned rule, refer to the description in the method of the embodiment shown in FIG. 3 above. Accordingly, for the base station, refer to the base station in the method provided in the embodiment shown in FIG. 3 above.

Step 502: the base station sends the primary DCI and the secondary DCI.

In the embodiment of the present invention, the base station may indicate that the UE uses standard bandwidth for scheduling or use nonstandard bandwidth for scheduling by sending DL grant to the UE. The UE may support the scheduling of 1 downlink grant (DL grant) or 2 DL grants, so that the UE may use standard bandwidth for scheduling and may also use nonstandard bandwidth for scheduling. When the UE detects 1 DL grant, the UE may perform scheduling in the standard bandwidth; and when the UE detects 2 DL grants, the UE may perform scheduling in the nonstandard bandwidth.

In this embodiment, for example, in the LTE system or the LTE-A system, the scheduling information carried by the downlink control channel may include scheduling information for scheduling a PDSCH, and the scheduling information for the PDSCH includes resource assignment information of the PDSCH. After the UE receives the two DCIs sent by the base station, the UE may acquire the scheduling information carried by the downlink control channel according to the method in the embodiment shown in FIG. 3 above.

The method provided in the embodiment of the present invention is illustrated below.

For example, in the LTE system, the standard bandwidth is 10 MHz (50 resource blocks (resource blocks, RBs)), and the actual extended bandwidth is 60 RBs. The transmission mode of the UE is transmission mode 4, and the downlink control signaling format of the DCI probably sent by the base station in a UE search area is DCI format 2 or DCI format 1A. Because the actual bandwidth is bigger than the standard bandwidth, the base station may send scheduling information carried by a PDCCH through 2 DCIs, for example, the sent downlink control signaling formats of the 2 DCIs are DCI format 2 and DCI format 1A respectively. The base station and the UE may preset the DCI of which the downlink control signaling format is format 2 as the primary DCI and the DCI of which the downlink control signaling format is format 1A as the secondary DCI. The base station sends the 2 DCIs on a PUCCH. The resource indication information of the primary DCI includes 17 bits, and 3 bits included in the secondary DCI are used for extending the resource indication information in the primary DCI. The 3 bits in the secondary DCI, used for extending the resource indication information in the primary DCI, may be the first 3 bits or the last 3 bits in the secondary DCI or any 3 bits preset by the base station and the UE. It shall be noted that, the 3 bits in the secondary DCI do not include the bits for indicating and distinguishing that the downlink control signaling format of the DCI is format 1A or format 0 in the DCI.

The UE detects the downlink control channel, receives the 2 DCIs sent by the base station, and may determine the DCI of which the downlink control signaling format is format 2 as the primary DCI and the DCI of which the downlink control signaling format is format 1A as the secondary DCI according to the rule known by both the UE and the base station in advance; and the UE extends the 17 bits in the resource indication information of the primary DCI through the extension information included in the secondary DCI, namely, the 3 bits, and acquires the scheduling information of the PDSCH according to the extended resource indication information, namely, the information carried by the 20 bits, thus receiving the PDSCH.

According to the solution provided by the aforementioned embodiment, the system using the extended bandwidth indicates the information carried by the downlink control channel by using 2 DCIs, so that the transmission of the downlink control channel corresponding to the extended bandwidth is indicated; moreover, the downlink control signaling formats of the used DCIs comply with the downlink control signaling format of the DCI corresponding to the standard bandwidth, therefore facilitating hardware implementation, and saving the storage space; and for the UE, if the UE enters a system using the standard bandwidth, the size of the DCI is not required to be recalculated. It is facilitated for the base station to calculate the optimal CCE resource occupied by the downlink control channel, so that wider coverage of the downlink control channel is ensured.

Figure 6:
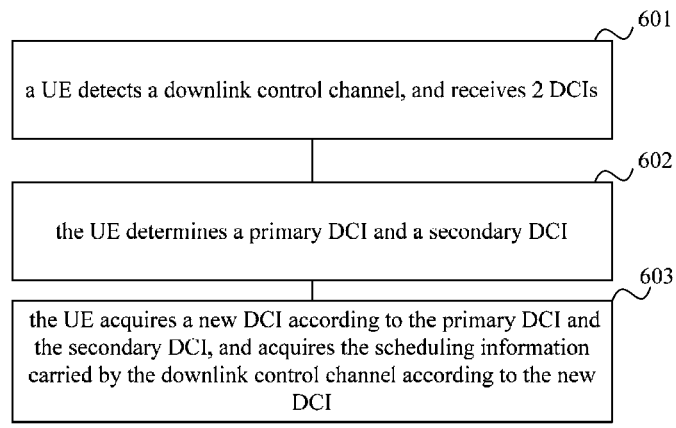
FIG. 6 is a flow schematic view of still yet another method for transmitting a downlink control channel provided in an embodiment of the present invention.

As shown in FIG. 6, provided in the embodiment of the present invention is still yet another method for transmitting a downlink control channel. The method may be applied to a communication system, and the communication system at least includes a UE and a base station. In the method provided in the embodiment of the present invention, the bandwidth serving as a resource is taken as an example for illustration. For those skilled in the art, a method for indicating an extended time domain resource and an extended code domain resource may be realized with reference to the method provided in the embodiment, which will not be described in the embodiment of the present invention one by one. The method may include:

step 601: the UE detects a downlink control channel, and receives 2 DCIs.

In the embodiment of the present invention, the UE may support standard bandwidth and nonstandard bandwidth. The UE may learn that the bandwidth required to be supported by the UE is the nonstandard bandwidth through high-layer signaling transmitted by the base station.

The 2 DCIs received by the UE may be marked as a first DCI and a second DCI respectively. The first DCI and the second DCI may jointly indicate the scheduling information carried by the downlink control channel.

The 2 DCIs received by the UE may be sent by the base station, and the base station may carry information for jointly indicating the scheduling information carried by the downlink control channel on the two DCIs. The base station may determine one DCI of the two DCIs as the primary DCI and the other DCI as the secondary DCI, for example, determine the first DCI as the primary DCI and the second DCI as the secondary DCI. The primary DCI and the secondary DCI may carry part of the information for indicating the scheduling information carried by the downlink control channel respectively, and the scheduling information carried by the downlink control channel may be completely indicated by combining the partial information in the primary DCI and the partial information in the secondary DCI. The primary DCI and the secondary DCI may be combined according to the sequence of the primary DCI and the secondary DCI preset by the base station and the UE.

The base station may calculate the number of bits required for indicating the scheduling information carried by the downlink control channel according to the actual bandwidth of the system, and if the number of the bits is bigger than the total number of the bits included in one DCI, the base station may indicate the scheduling information carried by the downlink control channel through 2 DCIs.

For example, according to the actual bandwidth of the system, the length of the DCI required for indicating the scheduling information carried by the downlink control channel is Y bits, the length of the primary DCI is N bits, Y and N are integers bigger than or equal to 1, and Y is bigger than N. The base station may incorporate n bits of information "$A_0A_1 \ldots A_{n-1}$" into the primary DCI, wherein, n is an integer bigger than or equal to 1 and smaller than or equal to N; and incorporate Y-n bits of information "$B_0B_1 \ldots B_{Y-n-1}$" into the secondary DCI, wherein the length of the secondary DCI is M bits, and Y-n is smaller than or equal to M. $A_{n-1}$ and $B_{Y-a-1}$ indicate one bit respectively. According to the presetting of the base station and the UE, the primary DCI may be set at a high order, the secondary DCI is set at a low order, and the combined information is "$A_0A_1 \ldots A_{n-1}B_0B_1 \ldots B_{Y-n-1}$", or, the primary DCI may be set at a low order, the secondary DCI is set at a high order, and the combined information is "$B_0B_1 \ldots B_{Y-n}A_0A_1 \ldots A_{n-1}$".

In the primary DCI and the secondary DCI, the bits for carrying the partial information may be randomly selected through the predefinition of the base station and the UE, for example, the aforementioned n bits in the primary DCI may be any n bits in the primary DCI, predefined by the base station and the UE, and the (Y-n) bits in the secondary DCI may be any (Y-n) bits in the secondary DCI, predefined by the base station and the UE. According to the downlink control signaling format of the primary DCI and the downlink control signaling format of the secondary DCI, the bits with specific purposes in the primary DCI and the secondary DCI may not be selected for indicating the scheduling information carried by the downlink control channel, for example, in the LTE system or the LTE-A system, a bit in the DCI of which the downlink control signaling format is format 1A, used for indicating that the downlink control signaling format of the DCI is format 1A or format 0, may not be selected for indicating the scheduling information carried by the PDCCH.

Step 602: the UE determines the primary DCI and the secondary DCI.

In this embodiment, the 2 DCIs received by the UE may have the same downlink control signaling format or may have different downlink control signaling formats. For the rule that the UE determines the primary DCI and the secondary DCI, refer to the rule that the UE determines the primary DCI and the secondary DCI in step 302 above.

Step 603: the UE acquires a new DCI according to the primary DCI and the secondary DCI, and acquires the scheduling information carried by the downlink control channel according to the new DCI.

Figure 7:
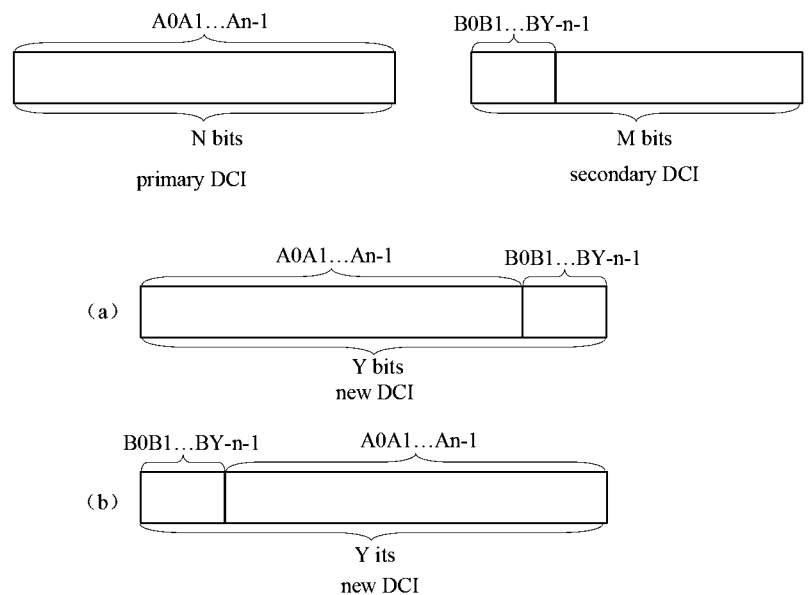
FIG. 7 is a structural schematic view of another DCI in an embodiment of the present invention.

After the UE determines the primary DCI and the secondary DCI, the UE may combine the information carried by the primary DCI and the information carried by the secondary DCI together according to the sequence of the primary DCI and the secondary DCI preset by the UE and the base station to obtain the new DCI. For example, as shown in FIG. 7, the length of the primary DCI is N bits, N is smaller than Y, Y is the number of bits required by the DCI for indicating the scheduling information carried by the downlink control channel corresponding to the actual bandwidth of the system, and Y and N are integers bigger than or equal to 1. The base station may incorporate n bits of information "$A_0A_1 \ldots A_{n-1}$" into the primary DCI, wherein, n is an integer bigger than or equal to 1 and smaller than or equal to N; and incorporate (Y-n) bits of information "$B_0B_1 \ldots B_{Y-n-1}$" into the secondary DCI, the length of the secondary DCI is M bits, and (Y-n) is smaller than or equal to M. $A_{n-1}$ and $B_{Y-n-1}$ indicate one bit respectively. According to the sequence that the primary DCI is placed at a high order and the secondary DCI is placed at a low order, predefined by the UE and the base station, the obtained information included in the new DCI is "$A_0A_1 \ldots A_{n-1}B_0B_1 \ldots B_{Y-n-1}$", as shown in (a) of FIG. 7; or, according to the sequence that the primary DCI is placed at a low order and the secondary DCI is placed at a high order, predefined by the UE and the base station, the obtained information included in the new DCI is "$B_0B_1 \ldots B_{Y-n}A_0A_1 \ldots A_{n-1}$", as shown in (b) of FIG. 7. The ordering of the information bits in the new DCI are the same as the ordering of the information bits in the downlink control signaling format of the primary DCI. Multiple fields are included in the DCI and arranged sequentially, each field has specific meaning, and each field occupies a specific number of bits. The information bits are all bits in the DCI. The DCI of each downlink control signaling format has a fixed information bit ordering, the same ordering expresses that the new DCI includes the same number of fields as the primary DCI, and the ordering of these fields is same.

In the embodiment of the present invention, for example, in the LTE system or the LTE-A system, the scheduling information carried by the PDCCH may include scheduling information for scheduling a PDSCH, the scheduling information for the PDSCH includes resource assignment information of the PDSCH, and the UE may acquire the resource assignment information and control information for data demodulation according to the scheduling information carried by the PDCCH so as to receive the PDSCH.

Figure 8:
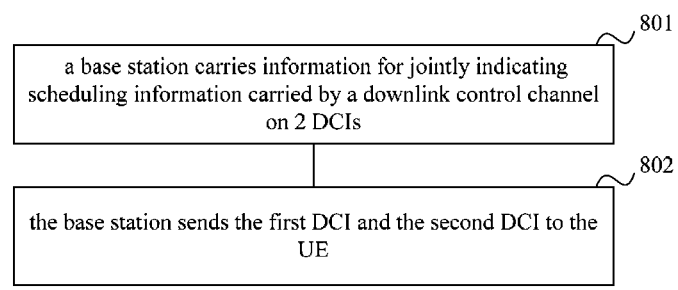
FIG. 8 is a flow schematic view of still yet another method for transmitting a downlink control channel provided in an embodiment of the present invention.

As shown in FIG. 8, provided in the embodiment of the present invention is still yet another downlink control channel transmission method. The method may be applied to a communication system, and the system at least includes a UE and a base station. The method may include:

step 801: the base station carries information for jointly indicating the scheduling information carried by a downlink control channel on 2 DCIs.

The base station may carry the information for jointly indicating the scheduling information carried by the downlink control channel on the 2 DCIs. The base station may distinguish one DCI in the 2 DCIs as the primary DCI and the other DCI as the secondary DCI. For this step, refer to the description in step 601 above.

Step 802: the base station sends the first DCI and the second DCI to the UE.

The base station sends the first DCI and the second DCI to the UE, so that the UE acquires the scheduling information carried by the downlink control channel according to the first DCI and the second DCI. For this step, refer to the description in step 602 and step 603 above.

For example, in the LTE system, the standard bandwidth is 10 MHz, the bandwidth actually used by the system is 60 B, the UE is configured in transmission mode 4, and the downlink control signaling format of the DCI probably sent by the base station is format 2 or format 1A. Because the actual bandwidth is bigger than the standard bandwidth, the base station may send the scheduling information carried by the PDCCH through the 2 DCIs, for example, the downlink control signaling formats of the 2 DCIs sent are DCI format 2 and DCI format 1A respectively. The base station and the UE may preset the DCI of which the downlink control signaling format is format 2 as the primary DCI and the DCI of which the downlink control signaling format is format 1A as the secondary DCI. If the UE detects the PDCCH and receives the 2 DCIs sent by the base station, the UE may determine the DCI of which the downlink control signaling format is format 2 as the primary DCI and the DCI of which the downlink control signaling format is format 1a as the secondary DCI according to the rule known by the UE and the base station in advance, and the UE may connect the information of the primary DCI and the secondary DCI according to the sequence preset by the UE and the base station, wherein, the primary DCI includes 46 bits, and the secondary DCI includes 26 bits; if the primary DCI is preset at a low order and the secondary DCI is preset at a high order, 72 bits may be obtained by sequentially connecting the primary DCI and the secondary DCI; and in the 72 bits, according to the preset rule, such as the first 49 bits, the last 49 bits or the like, the determined 49 bits are taken out to obtain the new DCI, the sequence of the information bits in this DCI is the same as that of the information bits in the primary DCI. The UE may acquire the scheduling information carried by the PDCCH according to the obtained DCI of the extended bandwidth, which includes the PDSCH scheduling information, thus receiving the PDSCH.

The UE may support standard bandwidth scheduling or nonstandard bandwidth scheduling; if the UE receives 1 DL grant from the base station, the UE performs scheduling in the standard bandwidth; and if the UE receives 2 DL grants from the base station, the UE performs scheduling in the nonstandard bandwidth.

According to the solution provided in the aforementioned embodiment, the system using the extended bandwidth indicates the information carried by the downlink control channel by using the 2 DCIs, so that the transmission of the downlink control channel corresponding to the extended bandwidth is indicated; moreover, the downlink control signaling formats of the used DCIs comply with the downlink control signaling format of the DCI corresponding to the standard bandwidth, and therefore hardware implementation is facilitated, and the storage space is saved; and for the UE, if the UE enters the system using the standard bandwidth, the size of the DCI is not required to be recalculated. It is facilitated for the base station to calculate the optimal CCE resource occupied by the downlink control channel, so that wider coverage of the downlink control channel is ensured.

Figure 9:
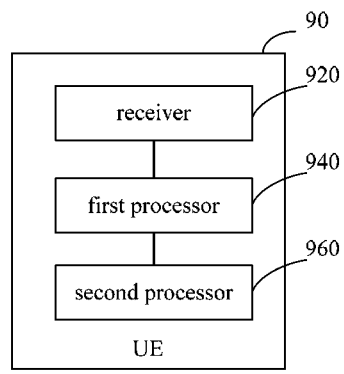
FIG. 9 is a structural schematic view of a UE provided in an embodiment of the present invention.

As shown in FIG. 9, disclosed in the embodiment of the present invention is a UE 90. The UE 90 may be the UE in the embodiments of the aforementioned methods, and the UE 90 may be applied to the embodiments of the aforementioned methods. The UE 90 may include:

a receiver 920, configured to receive a first DCI and a second DCI, wherein, the first DCI and the second DCI are used for jointly indicating scheduling information carried by a downlink control channel;

a first processor 940, configured to determine the first DCI as a primary DCI and the second DCI as a secondary DCI, which are received by the receiver 920;

a second processor 960, configured to acquire the scheduling information carried by the downlink control channel according to the primary DCI and the secondary DCI which are determined by the first processor 940.

In the embodiment of the present invention, the second processor 960 may be configured to directly acquire the scheduling information carried by the downlink control channel according to the primary DCI and the secondary DCI, or determine a new DCI according to the primary DCI and the secondary DCI which are determined by the first processor and acquire the scheduling information carried by the downlink control channel according to the new DCI.

In the embodiment of the present invention, the receiver 920 may be further configured to receive resource indication information included in the first DCI and extension information included in the second DCI, wherein, the extension information is used for extending the resource indication information in the first DCI. The second processor 960 is further configured to: acquire the new DCI according to the extension information in the secondary DCI and the resource indication information in the primary DCI, which are received by the receiver 920, wherein, the new DCI includes extended resource indication information obtained by extending the resource indication information in the primary DCI according to the extension information in the secondary DCI; and acquire the scheduling information carried by the downlink control channel according to the extended resource indication information.

Or, in the embodiment of the present invention, the receiver 920 may be further configured to receive bits included in the first DCI and bits included in the second DCI, and the bits included in the first DCI and the bits included in the second DCI jointly carry the scheduling information carried by the downlink control channel; the second processor 960 may be further configured to acquire a new DCI according to a combination of the bits included in the first DCI and the bits included in the second DCI, and the ordering of the information bits in the new DCI are the same as the ordering of the information bits in the downlink control signaling format of the primary DCI.

In the embodiment of the present invention, the first processor 940 of the UE 90 may be further configured to determine the first DCI as the primary DCI and the second DCI as the secondary DCI according to any of the following rules when the downlink control signaling format of the first DCI and the downlink control signaling format of the second DCI are same or the downlink control signaling format of the first DCI and the downlink control signaling format of the second DCI are different: if the logical number of the first CCE occupied by the first DCI is bigger than that of the first CCE occupied by the second DCI, determining the first DCI as the primary DCI and the second DCI as the secondary DCI; or, if the logical number of the first CCE occupied by the first DCI is smaller than that of the first CCE occupied by the second DCI, determining the first DCI as the primary DCI and the second DCI as the secondary DCI; or, if the Cyclic redundancy check (CRC) of the first DCI is scrambled by adopting a special code point and the CRC of the second DCI is not scrambled by adopting the special code point, determining the first DCI as the primary DCI and the second DCI as the secondary DCI; or, if the CRC of the first DCI is not scrambled by adopting the special code point and the CRC of the second DCI is scrambled by adopting the special code point, determining the first DCI as the primary DCI and the second DCI as the secondary DCI; or, if the CRC of the first DCI is scrambled by adopting a first special code point and the CRC of the second DCI is scrambled by adopting a second special code point different from the first special code point, determining the first DCI as the primary DCI and the second DCI as the secondary DCI; or, if not all bits of the resource assignment field of the first DCI are 1 and all bits of the resource assignment field of the second DCI are 1, determining the first DCI as the primary DCI and the second DCI as the secondary DCI; or, if not all bits of the MCS field of the first DCI are 1 and all bits of the MCS of the second DCI are 1, determining the first DCI as the primary DCI and the second DCI as the secondary DCI; or, if the first DCI fails to satisfy the condition that the MCS field indication information of the first DCI is equal to 0 and the redundancy version indication information is not equal to 0, and the MCS field indication information of the second DCI is equal to 0 and the redundancy version indication information is not equal to 0, determining the first DCI as the primary DCI and the second DCI as the secondary DCI.

Or, the first processor 940 of the UE 90 may be further configured to determine the first DCI as the primary DCI and the second DCI as the secondary DCI according to the presetting of the UE 90 and the base station when the downlink control signaling format of the first DCI is different from that of the second DCI, and the UE 90 and the base station preset the first DCI as the primary DCI and the second DCI as the secondary DCI.

Figure 10:
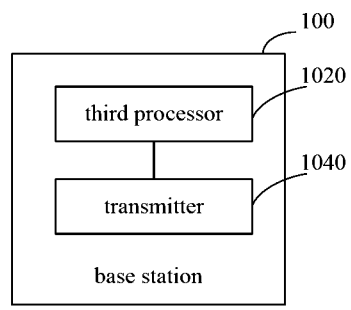
FIG. 10 is a structural schematic view of a base station provided in an embodiment of the present invention.

As shown in FIG. 10, also provided in the embodiment of the present invention is a base station 100. The base station 100 may be the one in the embodiments of the aforementioned methods, and the base station 100 may use the embodiments of the aforementioned methods. The base station 100 may include: a third processor 1020, configured to carry information for jointly indicating scheduling information carried by a downlink control channel on a first DCI and a second DCI, wherein, the first DCI is a primary DCI, and the second DCI is a secondary DCI;

a transmitter 1040, configured to send the first DCI and the second DCI to UE.

In this embodiment, the third processor 1020 may be further configured to incorporate resource indication information into the first DCI and incorporate extension information into the second DCI, wherein, the extension information is used for extending the resource indication information in the first DCI.

Or, the third processor 1020 may be further used for incorporating bits into the first DCI and incorporating bits into the second DCI, and the bits included in the first DCI and the bits included in the second DCI jointly carry the scheduling information carried by the downlink control channel; and the bits included in the first DCI and the bits included in the second DCI are combined into a new DCI, and the ordering of the information bits in the new DCI are the same as the ordering of the information bits in the downlink control signaling format of the primary DCI.

Figure 11:
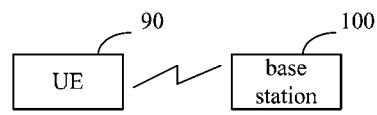
FIG. 11 is a structural schematic view of a communication system provided in an embodiment of the present invention.

As shown in FIG. 11, provided in the embodiment of the present invention is a communication system. The system may include the UE 90 provided in the aforementioned embodiment or the base station 100 provided in the aforementioned embodiment. For the UE 90, refer to the UE in the embodiments of the aforementioned methods and the contents in the embodiment shown in FIG. 9 above. For the base station 100, refer to the base station in the embodiments of the aforementioned methods and the contents in the embodiment shown in FIG. 10 above. The repetitive description is omitted here.

According to the device and the system provided in the embodiments of the present invention, the system using the extended resource indicates the information carried by the downlink control channel by using the 2 DCIs, so that the transmission of the downlink control channel corresponding to the extended resource is indicated; moreover, the downlink control signaling formats of the used DCIs comply with the downlink control signaling format of the DCI corresponding to the standard resource, and thus facilitating hardware implementation and saving the storage space; and for a UE, if the UE enters the system using the standard resource, the size of the DCI is not required to be recalculated. The base station may calculate the optimal CCE resource occupied by the downlink control channel, so that wider coverage of the downlink control channel is ensured.

Those skilled in the art may understand that, information and signals may be expressed by using any technology techniques, for example, data, instructions, command, information, signal, bit, symbol and chip may be expressed through voltage, current, electromagnetic wave, magnetic field or magnetic particles, optical field or optical particles or a random combination thereof.

Those skilled in the art may also learn that the various illustrative logical blocks and steps listed in the embodiments of the present invention may be realized through electronic hardware, computer software or a combination of the two. In order to clearly display the interchangeability of hardware and software, the aforementioned illustrative components and steps have already universally described the functions of the hardware and the software. Whether these functions are realized through the hardware or the software depends on the specific applications and design requirements of the whole system. For each specific application, those skilled in the art may use various methods to realize the functions, but this realization shall not be considered as being beyond the protection scope of the embodiments of the present invention.

The described functions of the various illustrative logical blocks, modules and circuits described in the embodiments of the present invention may be realized or operated through the design of a general processor, a digital signal processor, an application-specific integrated circuit (ASIC), a field-programmable gate array (FPGA) or other programmable logic devices, a discrete gate or transistor logic, discrete hardware components or any combination thereof. The general processor may be a microprocessor. Alternatively, the general processor may also be any traditional processor, controller, microcontroller or state machine. The processor may also be realized through the combination of calculation devices, such as a digital signal processor and a microprocessor, multiple microprocessors, one or more microprocessors combined with a digital signal processor core or any other similar configurations.

The steps of the methods or algorithms described in the embodiments of the present invention may be directly embedded into hardware, software modules executed by the processor or a combination of the two. The software modules may be stored in a random access memory (RAM), a flash memory, a read-only memory (ROM), an electrically programmable read-only memory (EPROM), an electrically erasable programmable read-only memory (EEPROM), a register, a hard disk, a mobile disk, a CD-ROM or other storage media in a random form in the art. Exemplarily, the storage medium may be connected with the processor, so that the processor may read information from the storage medium and write information to the storage medium. Alternatively, the storage medium may also be integrated into the processor. The processor and the storage medium may be arranged in the ASIC, and the ASIC may be arranged in a user terminal. Alternatively, the processor and the storage medium may also be arranged in different components of the user terminal.

In one or more exemplary designs, the aforementioned functions described in the embodiments of the present invention may be realized in hardware, software, firmware or a random combination of the three. If the functions are realized in the software, these functions may be stored in a computer-readable medium or transmitted to the computer-readable medium in the form of one or more instructions or codes. The computer-readable medium includes a computer storage medium and a communication medium for conveniently transferring computer programs from one place to another place. The storage medium may be an available medium capable of being accessed by any general or special computer. For example, such computer-readable medium may include but not limited to RAM, ROM, EEPROM, CD-ROM or other optical disk storage, disk storage or other magnetic storage devices, or any other medium for carrying or storing instructions or data structures and other program codes capable of being read by general or special computers or processors. Moreover, any connection may be appropriately defined as the computer-readable medium, for example, if the software is transmitted from a web site, a server or other remote resources through a coaxial cable, a fiber computer, a twisted pair or a digital subscriber line (DSL) or in a wireless mode of infrared, radio, microwave and the like, the software is also included in the defined computer-readable medium. The disks and discs include compressed discs, laser discs, optical discs, DVDs, soft discs and blue-ray discs; the discs generally magnetically copy data; and the disks generally optically copy data through laser. A combination of the aforementioned components may also be included in the computer-readable medium.

The aforementioned descriptions of the specification of the present invention may enable those skilled in the art to utilize or realize the contents of the present invention, any modification based on the disclosed contents shall be considered apparent in the art, and the basic principle described in the present invention may be applied to other variations without departing from the essence and scope of the present invention. Therefore, the contents disclosed in the present invention are not only limited to the described embodiments and design, but also may be extended to the maximum scope in accordance with the principle of the present invention and the disclosed new characteristics.

The invention claimed is:

1. A method for transmitting a downlink control channel, comprising:
   receiving, by a user equipment (UE), first downlink control information (DCI) and second DCI, wherein, the first DCI and the second DCI are used for jointly indicating scheduling information of an extended resource carried by the downlink control channel, wherein the first DCI corresponds to a standard resource, and wherein the extended resource is bigger than the standard resource and includes the standard resource;
   determining, by the UE, that the first DCI is a primary DCI and that the second DCI is a secondary DCI;
   determining, by the UE, a new DCI according to the primary DCI and the secondary DCI; and
   acquiring the scheduling information carried by the downlink control channel according to the new DCI,
      wherein the first DCI comprises resource indication information;
      wherein the second DCI comprises extension information;
      wherein the extension information is used for extending the resource indication information in the first DCI, and
      wherein the determining, by the UE, a new DCI according to the primary DCI and the secondary DCI and acquiring the scheduling information carried by the downlink control channel according to the new DCI comprises:
         acquiring the new DCI according to the extension information in the secondary DCI and the resource indication information in the primary DCI, wherein the new DCI comprises extended resource indication information obtained by extending the resource indication information in the primary DCI according to the extension information in the secondary DCI; and
         acquiring the scheduling information carried by the downlink control channel according to the extended resource indication information.

2. The method according to claim 1, wherein a number of bits occupied by the extension information in the second DCI is determined according to a resource indication mode of the first DCI and a bandwidth supported by the UE.

3. The method according to claim 1, wherein determining, by the UE, that the first DCI is the primary DCI and that the second DCI is the secondary DCI is performed according to a rule from the group of rules consisting of:
   if a logical number of a first control channel element (CCE) occupied by the first DCI is bigger than a logical number of a first CCE occupied by the second DCI, determining that the first DCI is the primary DCI and that the second DCI is the secondary DCI;
   if a logical number of a first CCE occupied by the first DCI is smaller than a logical number of a first CCE occupied by the second DCI, determining that the first DCI is the primary DCI and that the second DCI is the secondary DCI;
   if a cyclical redundancy check (CRC) of the first DCI is scrambled by adopting a special code point and a CRC of the second DCI is not scrambled by adopting the special code point, determining that the first DCI is the primary DCI and that the second DCI is the secondary DCI;
   if a CRC of the first DCI is not scrambled by adopting a special code point and a CRC of the second DCI is scrambled by adopting the special code point, determining that the first DCI is the primary DCI and that the second DCI is the secondary DCI;
   if a CRC of the first DCI is scrambled by adopting a first special code point and a CRC of the second DCI is scrambled by adopting a second special code point different from the first special code point, determining that the first DCI is the primary DCI and that the second DCI is the secondary DCI;
   if not all bits of a resource assignment field of the first DCI are 1 and all bits of a resource assignment field of the second DCI are 1, determining that the first DCI is the primary DCI and that the second DCI is the secondary DCI;
   if not all bits of a Modulation and Code Scheme (MCS) field of the first DCI are 1 and all bits of an MCS of the second DCI are 1, determining that the first DCI is the primary DCI and that the second DCI is the secondary DCI; and
   if MCS field indication information of the first DCI is equal to 0 and redundancy version indication information of the first DCI is not equal to 0, and MCS field indication information of the second DCI is equal to 0 and redundancy version indication information of the second DCI is not equal to 0, determining that the first DCI is the primary DCI and that the second DCI is the secondary DCI.

4. The method according to claim 1, wherein a downlink control signaling format of the first DCI is different from a downlink control signaling format of the second DCI, and the UE determines that the first DCI is the primary DCI and that the second DCI is the secondary DCI comprises:
the UE determines that the first DCI is the primary DCI and that the second DCI is the secondary DCI according to a rule known by the UE and a base station.

5. The method according to claim 1, wherein a downlink control signaling format of the second DCI is format 1A.

6. A method for transmitting a downlink control channel, comprising:
carrying, by a base station, information for jointly indicating scheduling information of an extended resource carried by the downlink control channel in first downlink control information (DCI) and in second DCI, wherein, the first DCI is primary DCI, and the second DCI is secondary DCI, and the first DCI corresponds to a standard resource, and wherein the extended resource is bigger than the standard resource and includes the standard resource;
sending, by the base station, the first DCI and the second DCI to a user equipment (UE);
determining, by the UE, that the first DCI is a primary DCI and that the second DCI is a secondary DCI;
determining, by the UE, a new DCI according to the primary DCI and the secondary DCI; and
acquiring scheduling information carried by the downlink control channel according to the new DCI;
wherein the first DCI comprises resource indication information;
wherein the second DCI comprises extension information;
wherein the extension information is used for extending the resource indication information in the first DCI, and
wherein the determining, by the UE, a new DCI according to the primary DCI and the secondary DCI and acquiring the scheduling information carried by the downlink control channel according to the new DCI comprises:
acquiring the new DCI according to the extension information in the secondary DCI and the resource indication information in the primary DCI, wherein the new DCI comprises extended resource indication information obtained by extending the resource indication information in the primary DCI according to the extension information in the secondary DCI; and
acquiring the scheduling information carried by the downlink control channel according to the extended resource indication information.

7. The method according to claim 6, wherein the carrying, by the base station, information for jointly indicating scheduling information carried by the downlink control channel in the first DCI and in the second DCI comprises:
incorporating, by the base station, resource indication information into the first DCI; and
incorporating, by the base station, extension information into the second DCI;
wherein the extension information is used for extending the resource indication information in the first DCI.

8. The method according to claim 7, wherein a number of bits occupied by the extension information included in the second DCI is determined according to a resource indication mode of the first DCI and a bandwidth supported by the UE.

9. The method according to claim 6, wherein the carrying, by the base station, information for jointly indicating scheduling information carried by the downlink control channel in the first DCI and in the second DCI comprises:
incorporating, by the base station, bits in the first DCI; and
incorporating, by the base station, bits into the second DCI;
wherein the bits included in the first DCI and the bits included in the second DCI jointly carry the scheduling information carried by the downlink control channel;
wherein the bits included in the first DCI and the bits included in the second DCI are combined into a new DCI; and
wherein an ordering of information bits in the new DCI is the same as an ordering of information bits in a downlink control signaling format of the primary DCI.

10. The method according to claim 6, wherein a condition is satisfied from the group consisting of:
a logical number of a first control channel element (CCE) occupied by the primary DCI is bigger than a logical number of a first CCE occupied by the secondary DCI,
a logical number of a first CCE occupied by the primary DCI is smaller than a logical number of a first CCE occupied by the secondary DCI,
a cyclical redundancy check (CRC) of the primary DCI is scrambled by adopting a special code point and a CRC of the secondary DCI is not scrambled by adopting the special code point,
a CRC of the primary DCI is not scrambled by adopting a special code point, and a CRC of the secondary DCI is scrambled by adopting the special code point,
a CRC of the primary DCI is scrambled by adopting a first special code point, and a CRC of the secondary DCI is scrambled by adopting a second special code point different from the first special code point,
not all bits of a resource assignment field of the primary DCI are 1 and all bits of a resource assignment field of the secondary DCI are 1,
not all bits of a Modulation and Code Scheme (MCS) field of the primary DCI are 1 and all bits of an MCS field of the secondary DCI are 1,
MCS field indication information of the primary DCI is equal to 0, redundancy version indication information of the primary DCI is not equal to 0, MCS field indication information of the secondary DCI is equal to 0, and redundancy version indication information of the secondary DCI is not equal to 0.

11. A user equipment, UE, comprising:
a receiver, configured to receive a first downlink control information (DCI) and a second DCI wherein the first DCI and the second DCI are used for jointly indicating scheduling information of an extended resource carried by a downlink control channel, wherein the first DCI corresponds to a standard resource, and wherein the extended resource is bigger than the standard resource and includes the standard resource;
a processor, configured to determine that the first DCI is a primary DCI and that the second DCI is a secondary DCI, to determine a new DCI according to the primary DCI and the secondary DCI, and to acquire the scheduling information carried by the downlink control channel according to the new DCI;
wherein the first DCI comprises resource indication information, the second DCI comprises extension information;
the receiver is further configured to receive resource indication information included in the first DCI and to receive extension information included in the second DCI, wherein the extension information is used for extending the resource indication information in the first DCI; and wherein the processor is further configured to:
acquire the new DCI according to the extension information in the secondary DCI and the resource indication information in the primary DCI, wherein, the new DCI comprises extended resource indication information obtained by extending the resource indication information in the primary DCI according to the extension information in the secondary DCI; and
acquire the scheduling information carried by the downlink control channel according to the extended resource indication information.

12. The UE according to claim 11, wherein the processor is further configured to determine that the first DCI is the primary DCI and that the second DCI is the secondary DCI according to a rule from the group of rules consisting of:
if a logical number of a first control channel element (CCE) occupied by the first DCI is bigger than a logical number of a first CCE occupied by the second DCI, determining that the first DCI is the primary DCI and that the second DCI is the secondary DCI;
if a logical number of a first CCE occupied by the first DCI is smaller than a logical number of a first CCE occupied by the second DCI, determining that the first DCI is the primary DCI and that the second DCI is the secondary DCI;
if a cyclical redundancy check (CRC) of the first DCI is scrambled by adopting a special code point and a CRC of the second DCI is not scrambled by adopting the special code point, determining that the first DCI is the primary DCI and that the second DCI is the secondary DCI;
if a CRC of the first DCI is not scrambled by adopting a special code point and a CRC of the second DCI is scrambled by adopting the special code point, determining that the first DCI is the primary DCI and that the second DCI is the secondary DCI;
if a CRC of the first DCI is scrambled by adopting a first special code point and a CRC of the second DCI is scrambled by adopting a second special code point different from the first special code point, determining that the first DCI is the primary DCI and that the second DCI is the secondary DCI;
if not all bits of a resource assignment field of the first DCI are 1 and all bits of a resource assignment field of the second DCI are 1, determining that the first DCI is the primary DCI and that the second DCI is the secondary DCI;
if not all bits of a Modulation and Code Scheme (MCS) field of the first DCI are 1 and all bits of an MCS of the second DCI are 1, determining that the first DCI is the primary DCI and that the second DCI is the secondary DCI; and
if MCS field indication information of the first DCI is equal to 0 and redundancy version indication information of the first DCI is not equal to 0, and MCS field indication information of the second DCI is equal to 0 and redundancy version indication information of the second DCI is not equal to 0, determining that the first DCI is the primary DCI and that the second DCI is the secondary DCI.

13. The UE according to claim 11, wherein the processor is further configured to determine that the first DCI is the primary DCI and that the second DCI is the secondary DCI according to a rule known by the UE and the base station,
wherein the downlink control signaling format of the first DCI is different from that of the second DCI; and
wherein the known rule specifies that the first DCI is the primary DCI and the second DCI is the secondary DCI.

* * * * *